(12) United States Patent
Mitchell

(10) Patent No.: US 8,343,599 B2
(45) Date of Patent: Jan. 1, 2013

(54) SURFACE COVERING FOR MELTING ICE AND SNOW

(76) Inventor: Jason Mitchell, West Chester, OH (US)

( * ) Notice: Subject to any disclaimer, the term of this patent is extended or adjusted under 35 U.S.C. 154(b) by 135 days.

(21) Appl. No.: 12/547,174

(22) Filed: Aug. 25, 2009

(65) Prior Publication Data

US 2010/0055360 A1    Mar. 4, 2010

Related U.S. Application Data

(60) Provisional application No. 61/092,003, filed on Aug. 26, 208.

(51) Int. Cl.
*B29D 23/00* (2006.01)
*B32B 3/00* (2006.01)

(52) U.S. Cl. ......... 428/34.1; 442/59

(58) Field of Classification Search ........ 4/581; 15/215, 15/238; 238/14; 219/528–553; 428/34.1, 428/36.91, 461, 512, 515; 442/59
See application file for complete search history.

(56) References Cited

U.S. PATENT DOCUMENTS

| | | | | |
|---|---|---|---|---|
| 1,569,934 A * | 1/1926 | Izzo | ............. | 15/238 |
| 1,845,782 A * | 2/1932 | Braze | ............. | 15/250.03 |
| 2,497,998 A | 2/1950 | Lee | | |
| 3,298,290 A * | 1/1967 | Du Fresne | ............. | 404/72 |
| 4,779,673 A * | 10/1988 | Chiles et al. | ............. | 165/45 |
| 5,366,650 A | 11/1994 | Wiesenfeld et al. | | |
| 5,380,988 A | 1/1995 | Dyer | | |
| 6,017,606 A * | 1/2000 | Sage et al. | ............. | 428/68 |
| 6,211,493 B1 | 4/2001 | Bouman | | |
| 6,278,085 B1 | 8/2001 | Abukasm | | |
| 7,628,150 B2 * | 12/2009 | Malkov | ............. | 126/271.1 |
| 2003/0054132 A1 | 3/2003 | Maupin | | |
| 2006/0290023 A1 * | 12/2006 | Suseelan | ............. | 264/165 |

FOREIGN PATENT DOCUMENTS

DE    19946165 A1 *    3/2001

\* cited by examiner

*Primary Examiner* — Rena L. Dye
*Assistant Examiner* — Susan R Dye
(74) *Attorney, Agent, or Firm* — Wood, Herron & Evans, LLP

(57) ABSTRACT

A surface covering for melting ice and/or snow comprises at least one elongate element arranged to form a generally flexible mat structure, and a melting composition integrated with the elongate element. The elongate element may comprise a tube defining a cavity therein, and the melting composition may be disposed within the cavity.

5 Claims, 3 Drawing Sheets

SURFACE COVERING FOR MELTING ICE AND SNOW

RELATED APPLICATION

This application claims priority to U.S. Provisional Patent Application No. 61/092,003, filed Aug. 26, 2008 (pending), the disclosure of which is incorporated by reference herein in its entirety.

TECHNICAL FIELD

The present invention relates generally to surface coverings, and more particularly to a surface covering for melting ice and/or snow.

BACKGROUND

The accumulation of ice and snow on driveways, walkways, steps, and other waling surfaces presents a slipping hazard to pedestrians. Aside from using manual labor to remove ice and snow from such surfaces, using shovels for example, conventional methods of treating ice and snow have involved the application of rock salt, or other ice and snow melting chemicals, in particulate form. Such ice and snow melting chemicals have generally been applied to the affected surfaces by hand or by a broadcast spreader to facilitate melting the ice and snow entirely, or to at least facilitate removal with a shovel. Various devices have also been proposed to facilitate melting ice and snow and which utilize electric power to generate heat to melt the ice and snow.

A need exists for an improved device that facilitates melting ice and snow and which can be quickly and easily applied to a desired surface and which does not require external power.

SUMMARY

While the invention will be described in connection with certain embodiments, it will be understood that the invention is not limited to these embodiments. On the contrary, the invention includes all alternatives, modifications and equivalents as may be included within the spirit and scope of the present invention.

According to one aspect, a surface covering for melting ice and/or snow comprises at least one elongate element arranged to form a generally flexible mat structure, and a melting composition integrated with the elongate element. The elongate element may comprise a tube defining a cavity therein, and the melting composition may be disposed within the cavity.

In another aspect, one or more elongate elements are woven to form the mat structure. In another aspect, at least one aperture is formed in the elongate element and communicates with the cavity whereby the melting composition is exposed to snow or ice through the aperture to facilitate melting the snow or ice. The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Figure 1:
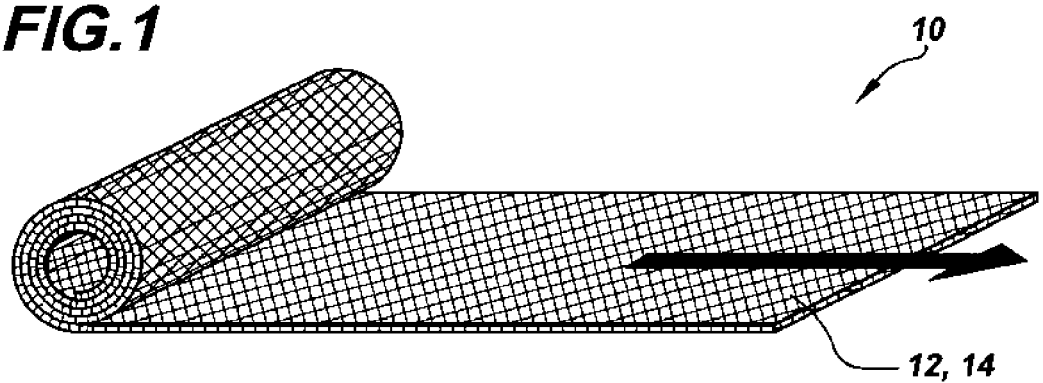
FIG. 1 is a perspective view of an exemplary surface covering for melting ice and snow in accordance with the present disclosure.

FIG. 1 depicts an exemplary surface covering 10 for melting ice and snow in accordance with the present disclosure. In this embodiment, the surface covering 10 comprises a generally flexible mat structure provided in roll form and which can be unrolled for application to a desired surface such as a sidewalk, driveway, steps, or other surfaces as may be desired, to facilitate melting ice and snow. The surface covering 10 may be applied to the desired surface prior to the accumulation of ice and snow, or the surface covering 10 may be applied atop previously accumulated ice and snow to facilitate melting. The surface covering 10 also provides additional traction for pedestrians traversing the affected surface when the surface covering is applied to treat previously accumulated ice and snow.

Figure 2:
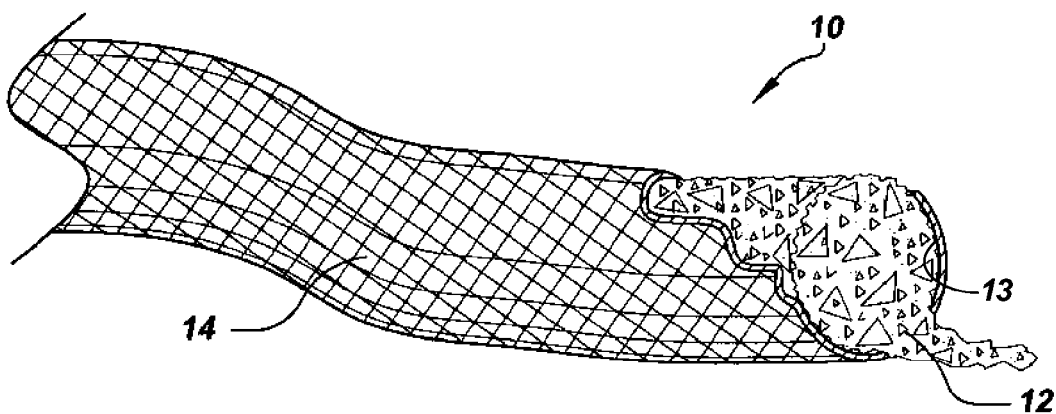
FIG. 2 is a perspective view of a tube used to form a surface covering of FIG. 1.
Figure 3:
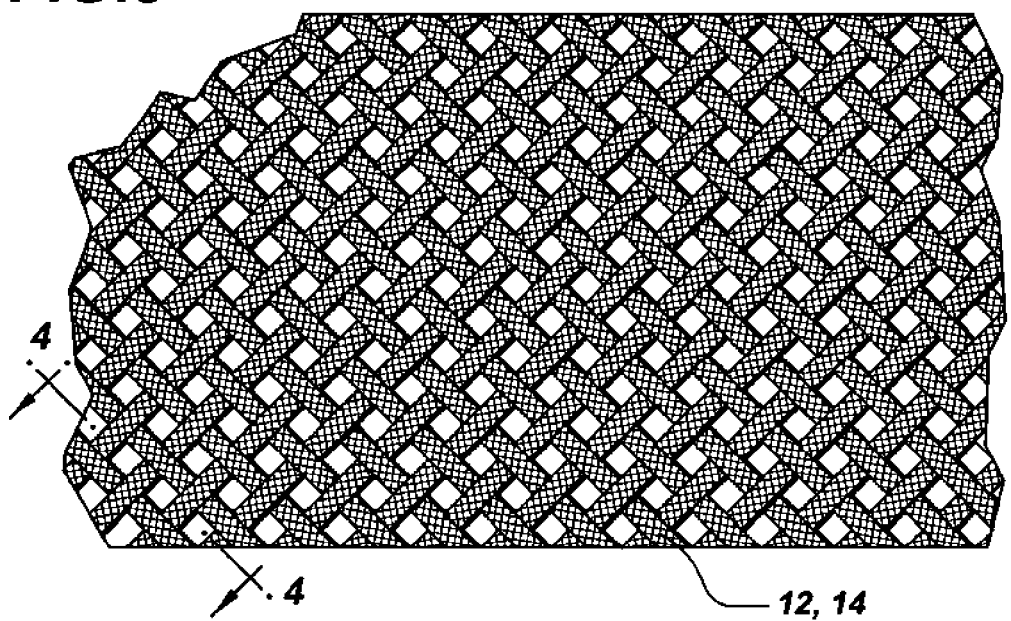
FIG. 3 is a top plan view of the surface covering of FIG. 1.
Figure 4:
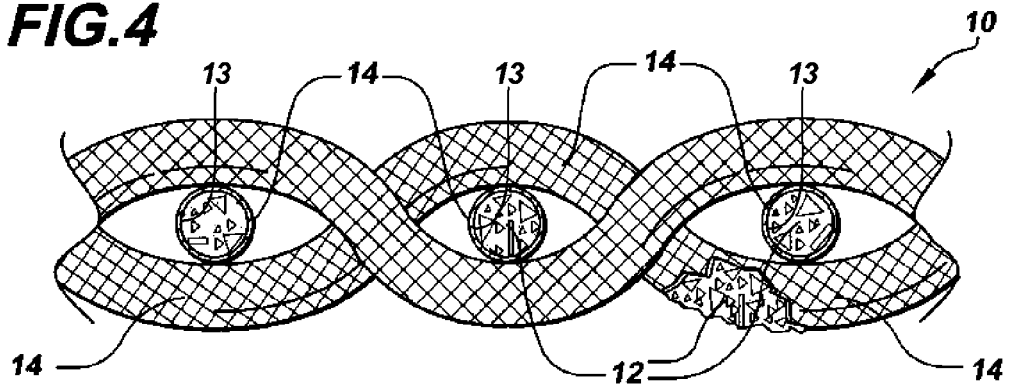
FIG. 4 is a cross-sectional view of the surface covering of FIG. 3 taken along line 4-4.
Figure 7:
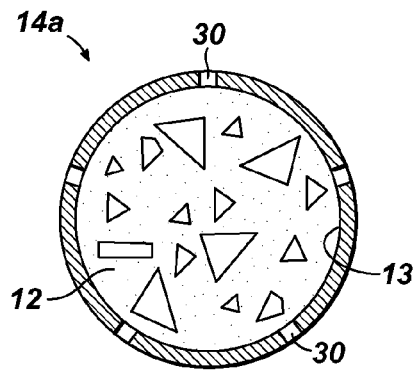
FIG. 7 is a cross-sectional view of an exemplary tube forming a surface covering in accordance with the present disclosure.

In the embodiment depicted in FIGS. 1, 3, and 4, the mat structure of the surface covering 10 comprises a woven arrangement of elongate tubular elements 14 having an ice and snow melting composition 12 integrated therewith. FIG. 2 depicts an exemplary elongate element 14 comprising a tube defining a cavity 13 therein, with the ice and snow melting composition 12 disposed within the cavity 13. The ice and snow melting composition 12 may comprise one or more of sodium chloride, calcium chloride, magnesium chloride, potassium chloride, urea, sodium acetate, ammonium nitrate, ammonium sulfate, or any other material suitable to facilitate melting ice and snow contacting the surface covering 10. In one embodiment, the elongate tubular element 14 is formed from cloth material that allows the ice and snow melting composition 12 to permeate through the material to facilitate melting the ice and snow. It will be appreciated, however, that the elongate tubular elements 14 may alternatively be formed from various other materials which may allow the ice and snow melting composition to permeate therethrough to facilitate melting the ice and snow contacting the surface covering 10. FIG. 7 depicts an alternative embodiment wherein elongate tubular element 14a includes perforations or apertures 30 that allow the ice and snow melting composition 12 within cavity 13 to be exposed to ice and snow contacting the surface covering 10.

Figure 6:
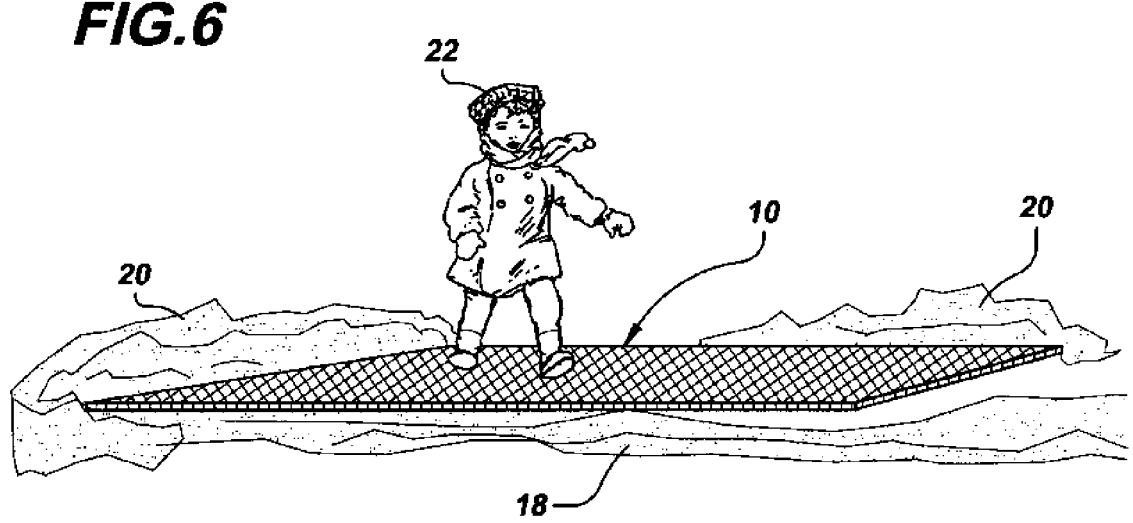
FIG. 6 is a perspective view of the surface covering of FIG. 1 in use.

In use, a surface covering 10 in accordance with the present disclosure may be positioned over a surface, such as a sidewalk, driveway, steps, or other surface, either before the accumulation of snow and/or ice 18, 20, or after snow and/or ice 18, 20 has accumulated on the surface, as depicted in FIG. 6. When the surface covering 10 is placed atop accumulated snow and/or ice 18, 20, the surface covering 10 provides a convenient treadable surface for persons 22 traversing the affected area. When the surface covering is no longer required, it may be easily removed by rolling it back into a roll, for example. The surface covering 10 may then be conveniently stored for subsequent re-use as described above.

Figure 5:
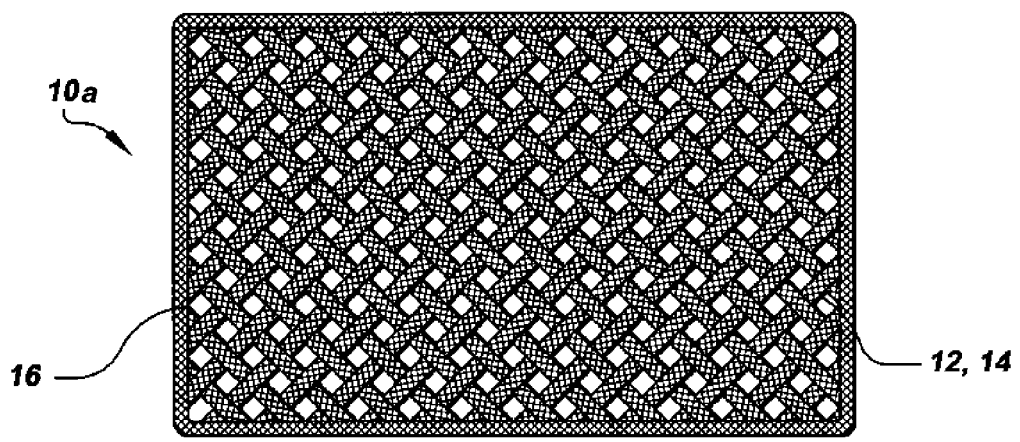
FIG. 5 is a top plan view of another exemplary surface covering in accordance with the present disclosure.

FIG. 5 depicts another exemplary surface covering 10*a*, similar to the surface covering 10 of FIG. 1, wherein the mat structure is sized and constructed in the form of a doormat having a border 16, which may also be formed from an elongate tubular element 14 described above. The surface covering 10*a* may be placed adjacent the entrance to a doorway, for example, to facilitate melting ice and snow accumulating at the doorway.

Figure 8:
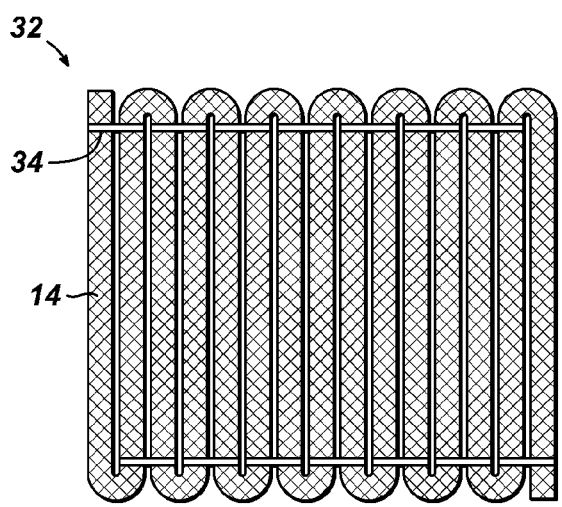
FIG. 8 is a top plan view of another exemplary surface covering in accordance with the present disclosure.
Figure 9:
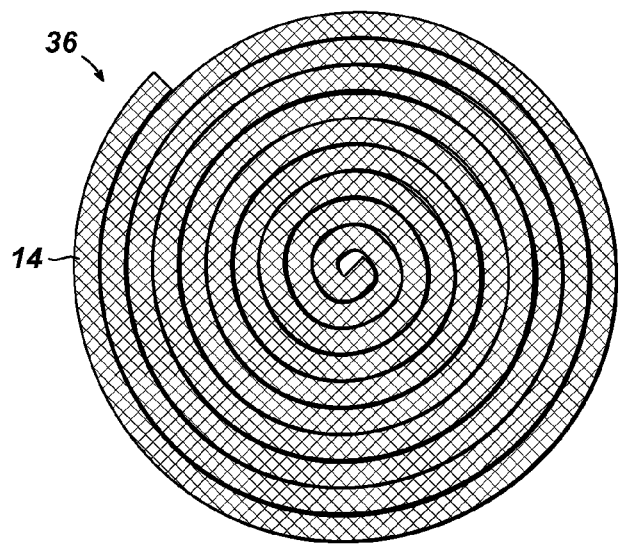
FIG. 9 is a top plan view of yet another exemplary surface covering in accordance with the present disclosure.

FIG. 8 depicts another exemplary surface covering 32 wherein the elongate tubular element 14 is arranged in a generally serpentine configuration to define the mat structure. The alternating turns of the elongate tubular element 14 may be secured to one another by cords 34 or other suitable materials. FIG. 9 depicts yet another exemplary embodiment of a surface covering 36 in accordance with the present disclosure. In this embodiment, the elongate tubular element 14 is wound in a spiral arrangement to define a generally circular mat structure.

While the present invention has been illustrated by a description of various embodiments, and while these embodiments have been described in considerable detail, it is not intended to restrict or in any way limit the scope of the appended claims to such detail. The various features shown and discussed herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A surface covering for melting ice or snow, comprising:
at least one elongate element arranged to form a generally flexible mat structure;
said flexible mat structure convertible between at least a first, generally planar condition for melting ice or snow, and a second, compact condition suitable for storage of said mat structure when not in use; and
a melting composition integrated with said at least one elongate element;
wherein said at least one elongate element comprises at least one tube defining a cavity therein and wherein said melting composition is disposed within said cavity;
wherein said at least one elongate element is formed from material that allows said melting composition to permeate therethrough; and
wherein said at least one tube comprises a plurality of tubes woven to form said mat structure.

2. The surface covering of claim 1, further comprising:
at least one aperture formed in said tube and communicating with said cavity;
said melting composition being exposable to ice or snow in contact with said tube through said aperture to thereby melt the ice or snow.

3. A surface covering for melting ice or snow, comprising:
at least one tube defining a cavity therein and arranged to form a generally flexible mat structure; and
a melting composition disposed within said cavity of said at least one tube;
said flexible mat structure convertible between at least a first, generally planar condition for melting ice or snow, and a second, compact condition suitable for storage of said mat structure when not in use;
said second, compact condition of said flexible mat structure being one of a rolled condition or a folded condition;
wherein said melting composition is retained in said cavity in said second condition; and
wherein said at least one tube comprises a plurality of tubes woven to form said mat structure.

4. The surface covering of claim 3, wherein said elongate element is formed from material that allows said melting composition to permeate therethrough.

5. The surface covering of claim 3, further comprising:
at least one aperture formed in said tube and communicating with said cavity;
said melting composition being exposable to ice or snow in contact with said tube through said aperture to thereby melt the ice or snow.

\* \* \* \* \*